United States Patent Office 3,450,814
Patented June 17, 1969

3,450,814
OPHTHALMIC COMPOSITIONS CONTAINING ALGINIC ACID SALTS OF PILOCARPINE, ATROPINE AND PHYSOSTIGMINE
Arthur W. Bechtold, Boonton, and Vincent J. Rizzo, North Arlington, N.J., assignors to Chemway Corporation, Wayne, N.J., a corporation of Delaware
No Drawing. Filed July 15, 1964, Ser. No. 382,963
Int. Cl. A61k 27/00
U.S. Cl. 424—180
6 Claims

ABSTRACT OF THE DISCLOSURE

The invention relates to isotonic aqueous ophthalmic solutions containing atropine alginate or pilocarpine alginate or physostigmine alginate.

This invention relates to new compositions of matter, to ophthalmic preparations containing them, and to methods for their manufacture. The new compositions of matter are the alginic acid salts of pilocarpine, atropine and physostigmine or eserine.

The alkaloids pilocarpine, atropine and eserine have long been known to have ophthalmic properties; pilocarpine and eserine possess miotic activity and atropine possesses mydriatic activity. These alkaloids have been used in the form of aqueous solutions of the hydrochloride and other salts, of both organic and inorganic acids. In the treatment of certain eye disorders, such as glaucoma and iritis, it is often desirable that the ophthalmic preparation be in prolonged contact with the eye, as for example, overnight, and for this reason the active materials have been incorporated into ointments. Ointments, however, are inconvenient to use and the active material is merely suspended in the ointment base. More recently, aqueous isotonic solutions containing the active material together with water-soluble thickening agents, such as methylcellulose and carboxymethylcellulose, have been employed but in such preparations the active material is merely dissolved in the thickened solution.

It has now been found that pilocarpine, which is water-soluble, and atropine and eserine, which are poorly water-soluble, form water-soluble salts when reacted with alginic acid, which acid is substantially water-insoluble. It has been found that aqueous solutions of the salts of the invention surprisingly provide a dramatic increase in duration of miotic and mydriatic activity, as compared to prior solutions. Moreover, this increase in duration is obtained with solutions of the salts of the invention that are less viscous than the prior solutions which have been thickened with methylcellulose or other gums. Thus new and improved water-soluble, ophthalmic preparations are provided by aqueous isotonic solutions of the salts of this invention. Alginic acid, which is a polymer of anhydro-β-D-mannuronic acid of colloidal dimensions, is available commercially in a wide molecular weight range so that the viscosity of the salts of this invention can be varied to some extent by selection of an alginic acid of appropriate molecular weight.

Alginic acid is described in an article by Arnold B. Steiner and William H. McNeely entitled "Organic Derivatives of Algin Acid" which appeared in Industrial and Engineering Chemistry, vol. 43, pages 2073–2077, for September 1951. The structure given therein is as follows:

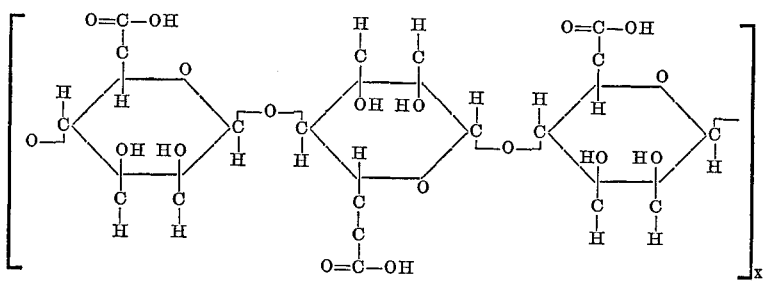

In an article by Arnold B. Steiner and William H. McNeely entitled, "Algin in Review," appearing in Advances in Chemistry Series, vol. 11, pages 68–82, (1954), published by the American Chemical Society, it is indicated that in the above formula x ranges from 180 to 930 and that the molecular weight ranges from about 32,000 to 200,000.

The salts of this invention are formed by mixing the water-insoluble alginic acid with an aqueous solution or suspension of the alkaloid base in approximately equivalent molecular proportions. The reaction proceeds at room temperature, although somewhat higher or lower temperatures can be employed, and at normal pressures. The pH of the aqueous admixture or dispersion of alginic acid is about 3.0 and upon addition of the base, the pH is raised. The slope of the curve defined by pH as to ordinate and the concentration of base as the abscissa is greatest within a pH range of about 4.0 to 8.0 and this is the range where the salt concentration in the solution is greatest. For ophthalmic preparations, however, an excess of base is often desirable, and hence the pH can range up to about 9.0. Such solutions can be made isotonic by addition of sodium chloride or other salts.

The new compositions of this invention can include preservatives such as phenyl mercuric acetate, phenyl mercuric nitrate, and thimerosal, and anti-oxidants such as sodium sulfite or sodium bisulfite in the case of the eserine solution.

This invention is illustrated by the following examples.

In all of the examples, the alginic acid employed was a commercial alginic acid in the form of a white, fibrous powder having a pH of about 3 in a 3% water dispersion and an equivalent weight of about 200.

EXAMPLE 1

Into a one liter flask containing about 400 cubic centimeters of water were introduced with stirring 4.505 grams of pilocarpine and 6.1 grams of alginic acid. 0.05 gram of thimerosal (0.01%) was added and then distilled water was added to provide a total volume of 500 cubic centimeters. The pH of the resulting solution was 5.9 and after a period of several weeks in a 40° oven the pH of the solution was 5.6. The assay of the final solution of pilocarpine alginate for pilocarpine showed 101% of the theoretical amount of pilocarpine.

EXAMPLE 2

Four grams of pilocarpine were dissolved in 200 cubic centimeters of distilled water and the solution was separated into two 100 cubic centimeter aliquots.

To the first aliquot were added 2.5 grams of alginic acid with stirring. The pH of the resulting solution was 7.2. To this solution were then added 1.4 grams of sodium chloride and the aliquot was diluted to 200 cubic centimeters with distilled water. Thimerosal was added to the final solution in the amount of one part to 10,000 parts of solution. This was sample R-752 and assayed 100% of the theoretical amount of pilocarpine.

To the second aliquot was added sufficient dilute hydrochloric acid to adjust the pH of the solution to 7.2. To this solution were then added 1.4 grams of sodium chloride and sufficient distilled water to provide 200 cubic centimeters of solution. Benzalkonium chloride in the amount of 1 part to 10,000 parts of solution was added as a preservative. This was sample R-751 and assayed 104% of the theoretical amount of pilocarpine.

A drop of the pilocarpine alginate solution, R-752, was instilled into the eye of a cat and a drop of the pilocarpine hydrochloride solution, R-751, was instilled into the other eye of the cat. The pilocarpine alginate solution produced a dramatic increase in miotic response when compared to the pilocarpine hydrochloride solution. The difference in miotic response could be observed with the naked eye for four hours.

EXAMPLE 3

Into a one liter flask containing about 400 cubic centimeters of water were introduced with stirring 4.505 grams of pilocarpine and 6.375 grams of alginic acid. 0.05 gram of thimerosal was added (0.01%) and then distilled water was added to provide a total volume of 500 cubic centimeters. The pH of the resulting solution was 4.9. Sodium carbonate in the amount of 3 grams was added and the pH of the resulting solution was 5.3. The assay of the final solution of pilocarpine alginate for pilocarpine showed 100% of the theoretcal amount of pilocarpine.

EXAMPLE 4

Atropine alginate was prepared by dissolving 0.833 grams of atropine in 100 cubic centimeters of water to which was added one gram of alginic acid (preparation R-770). The pH of the resulting solution was 6.8. A drop of this solution was instilled into the eye of a cat and a drop of a commercial solution of atropine sulfate with an equivalent atropine base content was instilled into the other eye of the cat. The mydriatic response to the atropine alginate solution lasted ten days or five times as long as the mydriatic response to the atropine sulfate solution (two days).

EXAMPLE 5

Physostigmine alginate was prepared by dissolving 1.10 grams of physostigmine (eserine) and 1.8 grams of alginic acid in 660 cubic centimeters of distilled water with stirring. Within a short time both materials went into solution, and to the solution was added 0.4 gram of sodium sulfite as an anti-oxidant. In tests in the eyes of a cat the solution indicates a miotic response of equivalent or longer duration than physostigmine salicylate of equivalent physostigmine content.

EXAMPLE 6

Into a flask containing about 1,000 cubic centimeters of water were introduced with stirring 18.00 grams of pilocarpine and 27.43 grams of alginic acid. To this solution of pilocarpine alginate 13.4 grams of sodium chloride and 0.2 gram of thimerosal were added. Distilled water was added to provide a total volume of 2,000 cubic centimeters. The pH of the resulting solution was 4.1 and sodium carbonate was added to bring the pH of the solution to 5.72.

What is claimed is:

1. A composition comprising an isotonic aqueous solution of a material selected from a class consisting of pilocarpine alginate, atropine alginate and physostigmine alginate, the solution having a pH within the range of about 4.5 to 9.0 and being ophthalmically effective.

2. A composition comprising an isotonic aqueous solution of pilocarpine alginate having a pH within the range of about 4.5 to 9.0 and being ophthalmically effective.

3. A composition comprising an isotonic aqueous solution of atropine alginate having a pH within the range of about 4.5 to 9.0 and being ophthalmically effective.

4. A composition comprising an isotonic aqueous solution of physostigmine alginate having a pH within the range of about 4.5 to 9.0 and being ophthalmically effective.

5. An ophthalmic preparation containing an ophthalmically effective amount of an isotonic aqueous solution of a material selected from the class consisting of pilocarpine alginate, atropine alginate and physostigmine alginate.

6. An ophthalmic preparation containing an ophthalmically effective amount of an isotonic aqueous solution of pilocarpine alginate.

References Cited

UNITED STATES PATENTS

| | | | |
|---|---|---|---|
| 2,547,653 | 4/1951 | Minnis et al. | 167—59 |
| 2,703,777 | 3/1955 | Feinstein et al. | 167—59 |
| 2,906,665 | 9/1959 | Doyle | 260—209.6 X |
| 2,962,499 | 11/1960 | Weiner et al. | 260—292 |
| 3,049,548 | 8/1962 | Sletzinger et al. | 260—309 |
| 3,073,831 | 1/1963 | Archer et al. | 260—292 |
| 3,133,083 | 5/1964 | Hester | 260—319 |
| 3,169,971 | 2/1965 | Sletzinger et al. | 260—309 |
| 3,161,654 | 12/1964 | Shen | 260—319 |

FOREIGN PATENTS 604,255  8/1960  Canada.

OTHER REFERENCES

Ouer, Annals of Allergy, May-June 1951, pp. 346–353.

Graham et al., Journal of Pharmaceutical Sciences, vol. 51, No. 10, October 1962, pp. 988–992.

ALBERT T. MEYERS, *Primary Examiner.*

VERA C. CLARKE, *Assistant Examiner.*

U.S. Cl. X.R.

260—209.6; 424—260, 265, 273, 279